Figure 1:
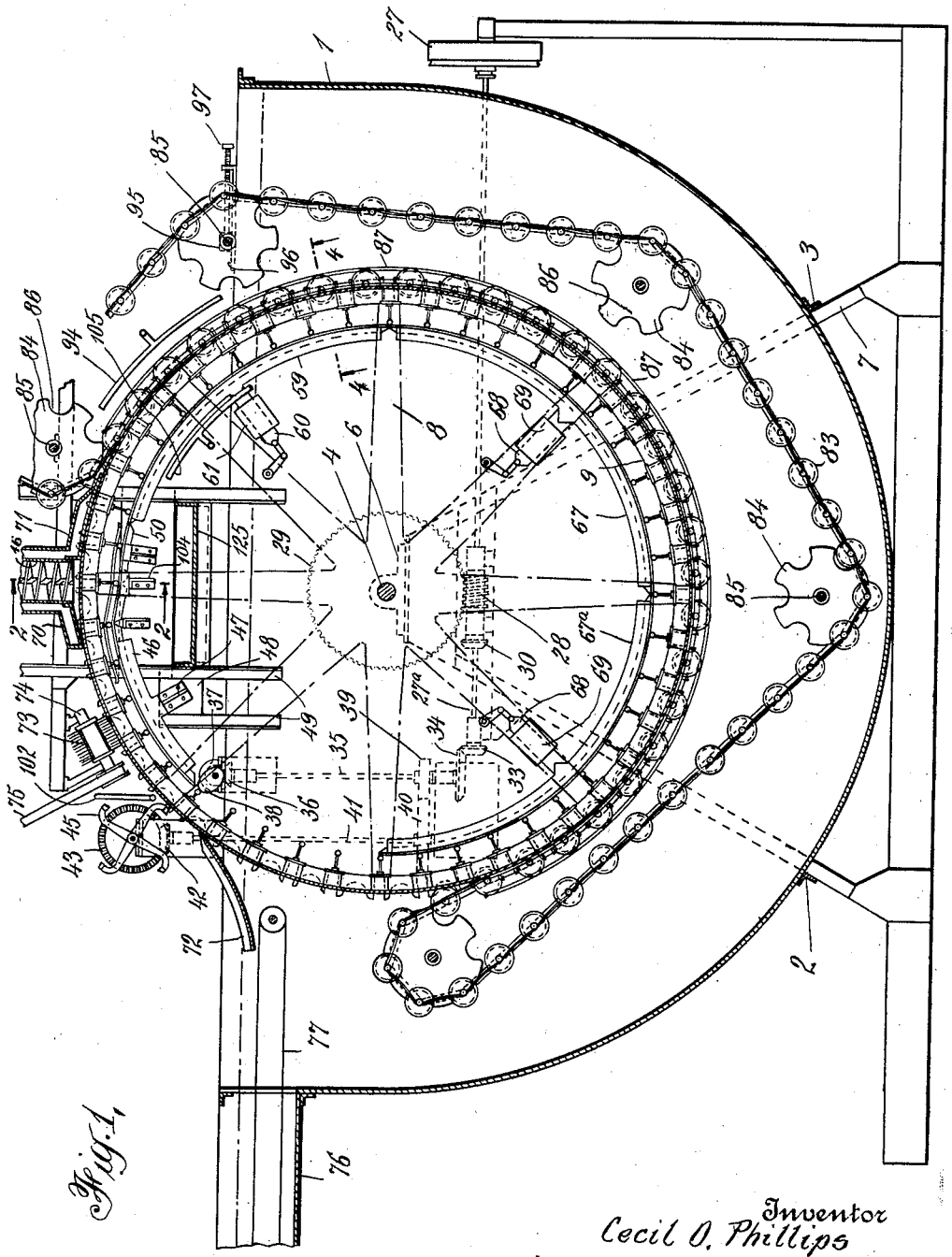

C. O. PHILLIPS.
APPARATUS FOR MOLDING SOAP.
APPLICATION FILED FEB. 24, 1921.

1,391,973.

Patented Sept. 27, 1921.
4 SHEETS—SHEET 1.

Inventor
Cecil O. Phillips
By his Attorneys

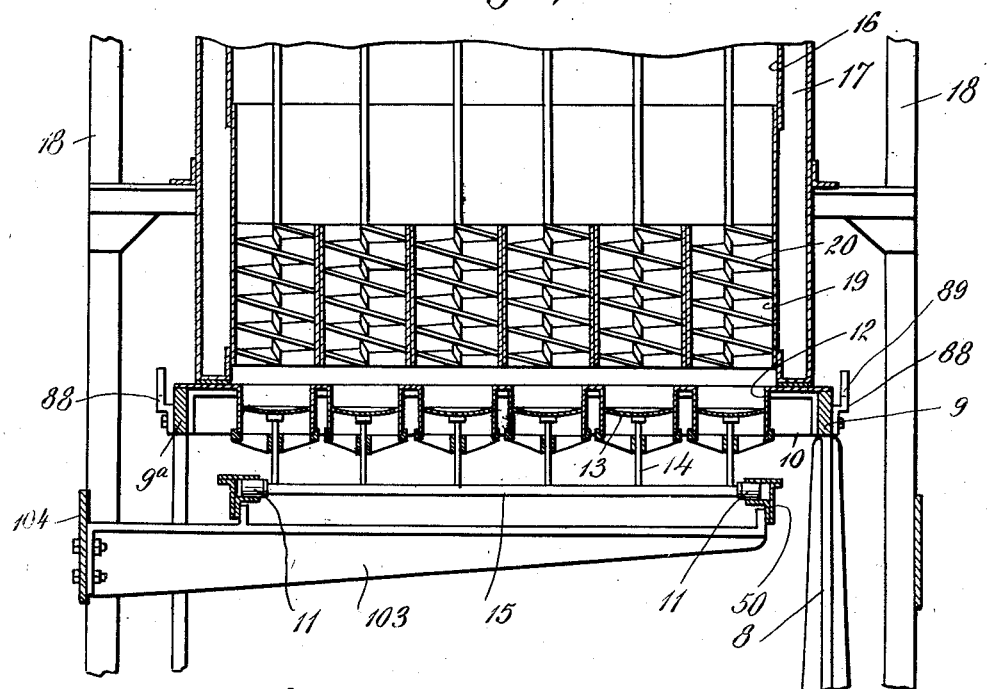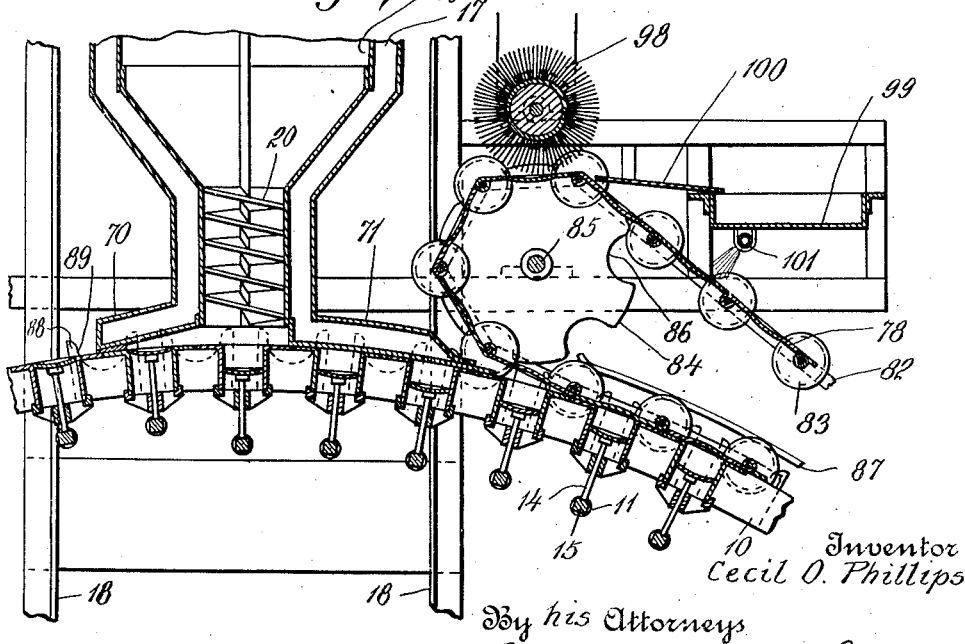

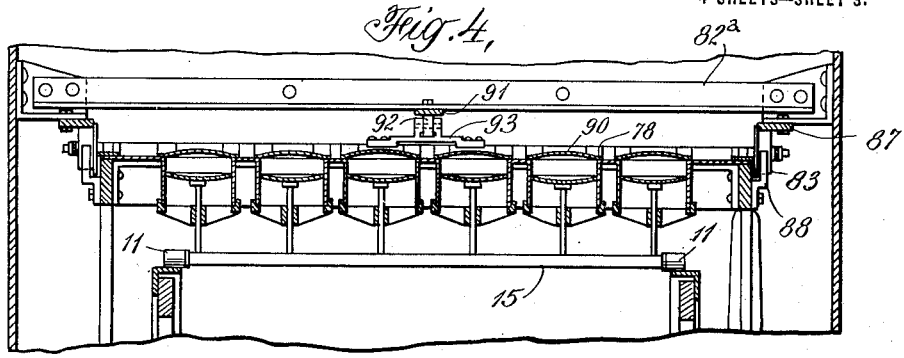
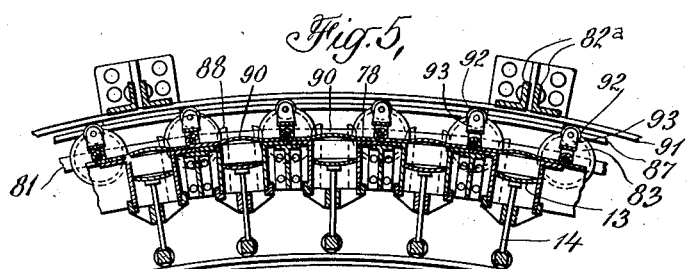
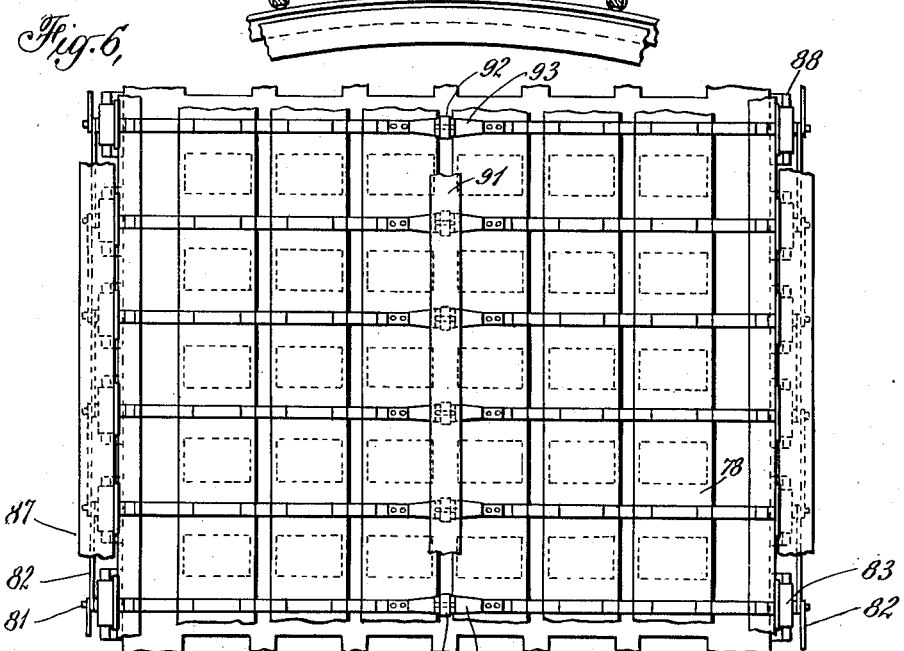
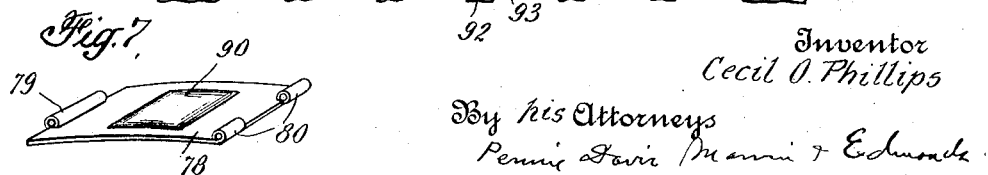

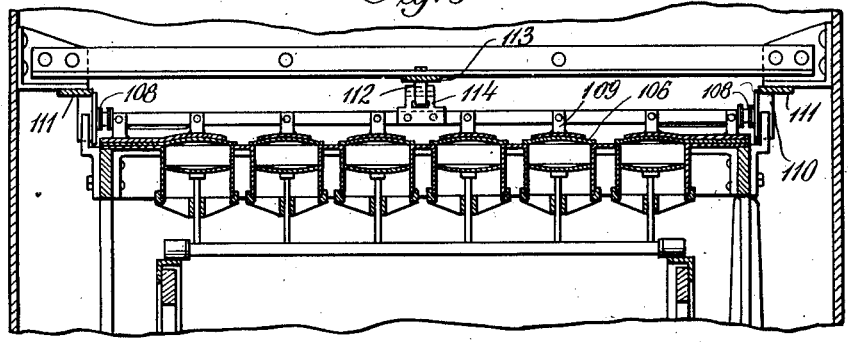
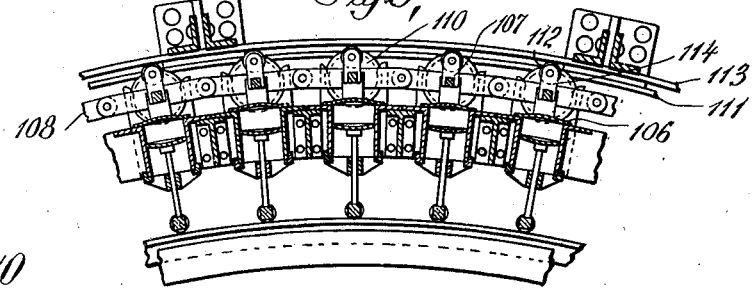
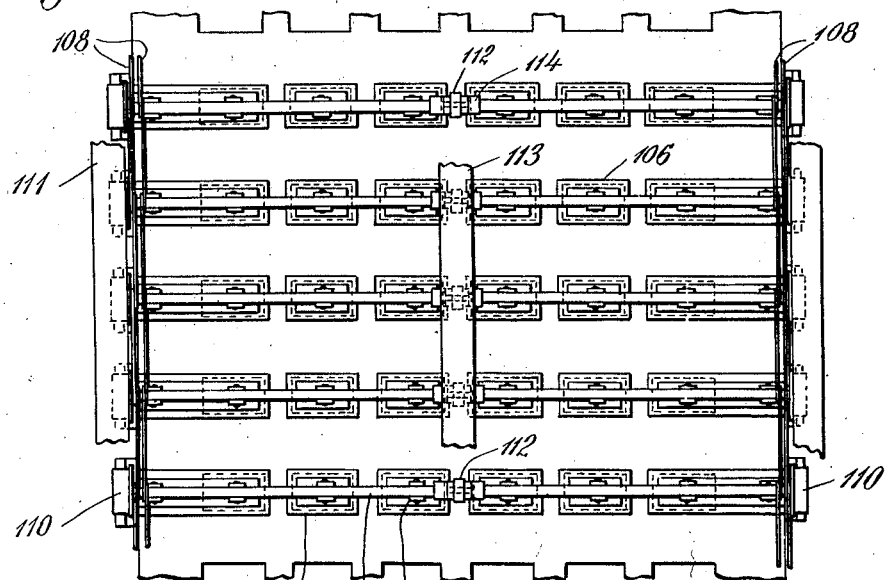
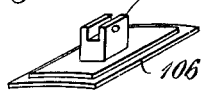

UNITED STATES PATENT OFFICE.

CECIL O. PHILLIPS, OF NEW YORK, N. Y., ASSIGNOR TO THE AMERICAN COTTON OIL COMPANY, OF NEW YORK, N. Y., A CORPORATION OF NEW JERSEY.

APPARATUS FOR MOLDING SOAP.

1,391,973. Specification of Letters Patent. Patented Sept. 27, 1921.

Application filed February 24, 1921. Serial No. 447,403.

*To all whom it may concern:*

Be it known that I, CECIL O. PHILLIPS, a citizen of the United States, residing at New York, in the county of New York, State of New York, have invented certain new and useful Improvements in Apparatus for Molding Soap; and I do hereby declare the following to be a full, clear, and exact description of the invention, such as will enable others skilled in the art to which it appertains to make and use the same.

This invention relates to an improved apparatus for the molding and cooling of soap in a rapid and advantageous manner. The apparatus is an improvement upon the apparatus of my prior application, Serial No. 386,912, filed June 5, 1920.

The apparatus of the present invention is, in its general construction and operation, similar to that of my said prior application. It is intended for the molding of molten soap for the production therefrom of a solidified and cooled cake. The apparatus comprises a receptacle for brine or cooling liquid and a series of molds cylindrically arranged and rotatable in the brine bath, together with means for filling the molds with molten soap, for protecting the soap while passing through the brine from direct contact therewith, and for discharging the cooled soap from the molds. The present invention includes certain features of improvement upon the apparatus of my said prior application which will be hereinafter more fully set forth.

Two preferred forms of apparatus, embodying the invention, are illustrated in a more or less conventional and diagrammatic manner in the accompanying drawings, in which—

Figure 1 is a sectional elevation of one form of apparatus embodying the invention, certain parts being omitted, Figs. 2 and 4 are enlarged views taken on the lines 2—2 and 4—4, respectively, of Fig. 1, Fig. 3 is an enlarged section at the feeding mechanism, and at right angles to Fig. 2, Fig. 5 is a partial section in the plane of the carrier wheel, Fig. 6 is a plan view of a portion of the cover plate carrying mechanism, Fig. 7 is a perspective view of one of the cover plates, Fig. 8 is a section similar to Fig. 4 of another embodiment of the invention, Fig. 9 is a section at right angles to Fig. 8, Fig. 10 is a partial plan view of the cover plate carrying mechanism, Fig. 11 is a perspective view of one of the cover plates.

In the apparatus illustrated in the accompanying drawings, the tank for the cold salt solution or brine or other cooling liquid, is indicated at 1, and is suitably supported by the supports 2 and 3 and by the shaft 4 which passes through suitable stuffing boxes (not shown), and is in turn supported by bearings 6 and support 7. The shaft 4 carries the spider or wheel 8 having a radially arranged outer rim 9 which in turn supports transverse arms 10 carrying the mold sections. These arms are connected at the opposite end from the rim 9 by a rim $9^a$ and the two rims and the arms form a species of drum. Each mold section has six molds 12 of approximately the shape of the cake of soap to be molded, and each mold has a movable bottom or piston 13 with a piston rod 14, the piston rods of each series of six molds being connected with the cross bar 15 having cam rollers 11 at its ends. The arrangement of the mold sections and molds is such that they form a cylindrical series of molds rotating upon the shaft 4.

Above the cylindrical series of molds is the soap container 16 having a steam jacket 17 for maintaining the soap at the proper temperature and preventing undue cooling thereof. The soap container is supported by the upright supports 18 and has six filling compartments 19, each with a filling screw 20 therein operated by suitable means (not shown).

Power is applied to the apparatus through the pulley 27 with which the worm 28 and the bevel pinions 30 and 33 are directly connected through the shaft $27^a$. The worm 28 drives the worm gear 29 which in turn causes the shaft 4 and the series of cylindrical molds carried thereby to be slowly but continuously rotated. The bevel gear 30 is intended to be connected (by means not shown) with the filling screws 20. The bevel gear 33 is connected, through the bevel gear 34, shaft 35, and bevel gears 36 and 37, with the cams 38. The shaft 35 also carries a pinion 39 which transmits power, through the gear 40, shaft 41, and bevel gears 42 and 43 to the arms 45, which are arranged to act upon the cooled cakes of soap to remove them from the pistons.

A series of track cams or cam surfaces are arranged within the cylindrical series of molds so that they act upon the rollers 11 and keep the pistons properly positioned in the molds. These cam surfaces or sectors include the sector 46, the double sectors 50, and the sectors 59, 67 and 67$^a$. The cam sectors 46 are supported by a cross arm 47 carried by the plate 48 and upright members 49. The cam sectors 50 have both an inner and an outer cam surface or track and are so adjusted as to cause lowering of the pistons in the molds while the molds are being filled. The cam sector 59 is adjustable by means of a slide 60 acting in the guide 61 and having suitable adjusting means. This cam sector as well as the other cam sectors are channel shaped, the channels forming a track or guide for the rollers. The cam sectors 67 and 67$^a$ are carried by slides 68 adjustable in guides 69, in the same manner as the slide 60 before mentioned is adjustable.

The jacket 17 of the soap container is extended on both sides of the container, as indicated at 70 and 71 respectively, and the bottom of the extension 71, which is of thin material, is so arranged that it forms a closure for the outer open ends of the molds. This serves for preventing cooling the outer portion of the soap in the mold. The bottom of the extension 70 is spaced above the mold support or rim 9—10. A slide 72 is arranged to receive the molded and cooled cakes of soap, as they are discharged from the mold. Above the carrying wheel, to the left of the soap container, there is arranged a transverse belt 73, carrying bristles, arranged to move in contact with the mold sections and the movable bottoms, which at this point are projected somewhat beyond the carrier. Any soap that may adhere to the said sections and bottoms will be removed by the bristles. The belt 73 is supported by a shaft 74, which is driven in any suitable manner, as for instance by a belt 75.

A tank 76 is provided for subjecting the molded and cooled cakes of soap to further direct cooling by the action of cold brine, when desired. This tank extends radially from the tank 1, and an endless belt 77 extends through the same, from the slide 72, for conveying the cakes of soap through the brine. The soap after it has been further cooled may then be sprayed or washed with fresh water, to remove adhering brine, and can then be passed through a drier, for removing excess water, and carried to the presses, if necessary, which give the cakes the final shape before they are packaged for shipment.

The apparatus thus far described, is of practically the same construction as that of my said prior application, Serial No. 386,912. In the apparatus of the said application, I have shown an adjustable band or strap for protecting the soap in the molds from direct contact with the brine, this strap extending around the cylindrical series of molds. Instead of providing such a stationary strap for protecting the soap in the molds, I provide in the present invention, a series of cover plates mounted to travel and to be moved by the mold carrier. These plates fit against the open outer ends of the molds, and close the molds, while they are passing through the brine, thus protecting the soap in the molds from direct contact with the brine. Since the plates travel with the molds, there is no relative movement of the soap with respect to the plate, which would tend to color the soap.

In the form of the invention shown in Figs. 1 to 7, the cover plates 78 are hinged together in an endless chain, each plate having at one end a central bearing 79, and at the other a pair of alined bearings 80, which are adapted to receive between them the bearing 79 of the succeeding plate, and pintle pins or rods 81 are passed through the alining bearings. Referring to Figs. 2 and 4 it will be seen that a cover plate is provided for each mold, and because the molds are arranged in sets of six, extending longitudinally of the drum, the cover plates are also arranged in sets of six. Each pintle pin or rod 81 connects two sets of six cover plates, and the ends of the pintle pins are connected by links 82, which connect the plates into an endless band or belt. Flanged wheels 83 are arranged on the ends of the pintle pins or rods, at the inner sides of the links 82, and the endless belt formed by the links and the pintle pins is supported by sprocket wheels 84, on shafts 85, which are journaled parallel with the shaft 4 at suitable points to support the endless belt, so that one run of the belt will move in contact with the periphery of the drum, as clearly shown in Fig. 1. Referring to Figs. 1 and 3 it will be noticed that the wheels 84 are deeply notched as indicated at 86 to receive the wheels 83, and the engagement of the wheels with the notches insures against possibility of relative movement of the belt and wheels.

The belt constituted by the cover plates and their connections is so arranged that a run thereof partially encircles the mold carrying drum, extending from the outer end of the section 71 to near the slide 72. The sprocket wheels 84 at each end of the endless belt are so arranged that the cover plates will move into engagement with the drum, and close the outer ends of the molds, as the molds leave the extension 71, and will move away from the drum and from the open ends of the molds, as the molds leave the cooling solution in the tank 1. That run of the endless belt which engages the drum moves with the drum, being moved thereby, and the plates are pressed tightly against the drum, by means of arc shaped track sections 87 which are arranged in such position, that as the cover plates move in contact with the periphery of the drum, the flanged wheels will move beneath the track sections, and the said track sections will hold the cover plates in close contact with the periphery of the drum. In order to insure the positioning of the cover plates directly over the open ends of the molds, circular guides 88 are secured to the rims 9 and 9ᵃ, and these guides are notched as indicated at 89 to receive the flanged wheels 83. Thus each cover plate will be exactly positioned with respect to its mold, the notches 89 being between adjacent molds, as shown more particularly in Fig. 3. This arrangement permits the cover plates to be shaped to conform with the contour of the cake of soap desired, as for instance oval. Referring to Fig. 7 it will be seen that the plates have outwardly arched portions 90 forming recess on the inner faces of the plates, which register with the open sides of the molds, closing the said open sides, and shaping that side of the cake of soap to correspond with the depression. Means is provided for supporting the belt at its longitudinal center, that is at the centers of the pintle pins 81. The said means is in the form of a track 91, which is carried by angle plates 82ᵃ extending transversely of the drum, and supported in any suitable manner. Rollers 92 are journaled in brackets 93 secured to the bearings 79 of the cover plates, and these rollers engage the tracks 91.

The piston rods 14 of each set of six molds, are as before stated connected with a common cross bar 15, having at each end a roller 11, and the rollers engage the cam sectors 46, 50, 59, 67 and 67ᵃ, to move the pistons or movable bottoms of the molds, and the sectors are so arranged, that the bottoms of each set will be simultaneously moved at predetermined moments in the travel of the molds, and in predetermined directions, and over predetermined distances.

In order to provide a preliminary cooling for the soap, before the bars of soap are moved into the cooling liquid, I arrange a spray pipe 94 at the beginning of that run of the endless belt which engages the periphery of the mold carrying drum. This pipe sprays a cooling liquid, as for instance brine, onto the cover plates, just after they move into contact with the molds, and they preliminarily cool the soap before it is plunged into the brine. The sprocket wheel carrying shaft 85 which is second from the soap container is mounted to be moved toward and from the drum. The ends of the shafts are journaled in bearings 95 which are slidable in guides 96 on the supporting frame of the tank 1, and the bearings are moved by screws 97 which have threaded engagement with the guides, and are rotatable with respect to the bearings. It will be understood that any or all of the shafts 85 may be so mounted if desired. Mechanism is also provided for cleaning the inner surfaces of the cover plates from adhering soap, brine and the like. Such mechanism comprises a cylindrical brush 98, which is journaled above that shaft 85 which is nearest the soap container, in such position that the bristles of the brush engage the inner faces of the cover plates, just before said plates are moved into contact with the periphery of the drum. A trough 99 is arranged at the outer side of the brush, and an inclined plate 100 is arranged to guide any material, as for instance soap, swept from the plates by the brush into the trough, from whence it may be removed when desired. Just before the plates are engaged by the brush, they are subjected to a spray of brine, from a pipe 101, which is supported below the trough 99, and is supplied with brine in any suitable manner. Another spray pipe 102 is arranged adjacent to the ejecting mechanism 45, for the cakes of soap. This pipe sprays the molds, just after the cakes of soap are moved therefrom. The cam sectors are carried by arms 103 which extend inwardly from a plate 104 carried by the uprights 18 at the opposite side of the drum from the spider 8.

In the operation of the apparatus, the molten soap from the crutcher, and compounded with the usual ingredients, is introduced into the soap container 16, and is kept at the proper temperature by the steam jacket. The drum carrying the cylindrical series of molds, is slowly and continuously rotated, and the sets of molds are brought successively beneath the soap containers. When the molds begin to move beneath the soap container, the movable bottoms thereof are held flush with the peripheral surface of the drum, by the cams 46 and 50. As the molds pass beneath the compartments 19 of the container, the pistons are drawn downwardly by the cam sectors, and the soap is simultaneously forced down into the molds by the action of the screws 20, so that the molds are filled with the molten soap, with substantial avoidance of the occlusion, or inclusion, in the molds of air bubbles or air pockets.

As the filled molds are rotated beyond the soap container, they are subjected to the heating action of the jacket extension 71, and to the cooling action of the spray 94 on the outer faces of the cover plates. Other spray pipes 105 are arranged at the inner sides of the molds, and these sprays also act to promote preliminary cooling and solidification of the soap in the molds. Before the soap in the molds passes into the cooling liquid in the tank, the molds are closed by the cover plates, so that when the molds pass into the liquid, the brine cannot contact directly with the soap. The cam sectors over which the rollers 11 pass, are so adjusted as to keep the pistons in contact with the soap in the molds, and to compress the soap therein sufficiently to make up for shrinkage, or even to give the soap an increased pressing operation in the molds. During the solidification the soap in the molds is rapidly chilled and solidified by the cold brine through the mold walls, and through the traveling belt, while the brine is kept from direct contact with the soap in the molds. The cakes of soap are thus rapidly cooled and solidified, as well as compressed sufficiently to compensate for shrinkage in the molds, so that the cakes are finally discharged from the molds in a solidified state of practically any desired shape.

The cakes of soap are removed from the molds by the action of the cams 38, which in turn act upon the rods 14 and force the pistons outwardly, so that the cakes of soap can be separated from the pistons by the action of the arms 45. The operation of the cams 38 and the arms 45 is properly timed for this purpose. After the soap cakes have been removed from the molds, they may be further cooled by passing through cold brine in the tank 76, and being directly subjected to the cooling action of the brine therein, after which they may be sprayed with fresh water to remove adhering brine, and then dried and pressed.

After the cakes of soap have been removed from the molds, the pistons and the outer surface of the mold sections are scraped free from adhering soap by the brush 73, and the molds are then moved past the soap container for refilling. The position of the pistons in the molds is regulated by the adjustable cam sectors, over which, or between which, the rollers 11 pass. The pistons can thus be kept flush with the surrounding surfaces, or slightly beyond the surrounding surfaces, while they are being brushed by the brush 73, and the pistons can then be drawn inwardly in the molds, simultaneously with the filling of the molds with soap. The pistons can also be moved outwardly in a progressive or regulated manner during the passage of the molds through the brine, so that any shrinkage of the cakes will be compensated for, or so that the cakes may even be given a preliminary pressing before they are finally discharged from the molds by the actions of the cams 38 and the arms 45.

The thickness of the cakes of soap can be varied, by adjusting the cam sectors, so as to vary the positions of the pistons in the molds during the operation. A thinner or thicker cake of soap can thus be produced. So also, the regulation of the rate of travel in the molds in the brine, as well as the temperature of the brine or other cooling liquid, can be so regulated as to give the desired cooling and solidification of the cakes of soap before they are discharged from the molds.

The brine employed can be kept at the proper temperature by any suitable cooling means, for example, by the use of ammonia refrigeration apparatus. By cooling the brine to a temperature of around 5° to 15° F., an energetic cooling action will take place and only a few minutes will be required to effect the necessary cooling of the soap cakes, so that the manufacture of the cakes of soap from the molten soap will take place rapidly and continuously, and give a correspondingly large capacity to the apparatus.

Immediately below the soap container 16 is a receptacle 125 for any soap that may escape around the pistons or otherwise. The soap collected in the receptacle is prevented from dropping into the brine, and can be scraped out of the receptacle from time to time. With proper construction and fitting of the pistons in the molds, and with proper operation of the apparatus, little if any escape into the receptacle should take place.

In the modification shown in Figs. 8 to 11 inclusive, there is shown a construction, wherein the individual cover plates 106 for the individual molds, are carried by rods 107 which are connected by the sprocket chains 108. One of the individual cover plates is shown in Fig. 11, and it will be seen that the plate has a shape and curvature such as to fit closely over the mold and close it, so as to prevent objectionable contact of the brine with the soap in the mold, while the mold is passing through the brine. Each of the cover plates has a notched block 109 on its upper convex face, and the rod or bar 107 is received within the notch, the block being pivoted to the rod or bar. The rod or bar carries the flanged wheels 110 at its ends which engage the tracks 111, and each bar has intermediate its ends a wheel or roller 112 which engages a track 113 supported at the center of the drum. These rollers 112 are journaled in brackets 114 secured to the bars at their center.

The apparatus of the present invention provides for the protection of the soap in the mold from objectionable contact with the brine, while the molds are passing there-through, the cakes of soap being covered within the molds by the cover plates, which travel with the molds, and are brought into engagement therewith after the molds are filled, and separated therefrom before the soap is to be removed from the molds. The belt which carries the cover plates, and the drum have interlocking engagement with each other, and such engagement constrains the cover plates not only to travel with the drum, but to engage the mold in a certain predetermined position, and to hold such position throughout the travel of the cover plate with the mold. The cover plates do not interfere with the desired cooling of the soap, because of their thinness and ready conductivity of heat and cold.

Inasmuch as certain materials are corroded by the action of the brine, with resulting tendency to discolor the soap, the apparatus should be constructed of material which is not acted upon by the brine, or, if not of such material, the parts that come into contact with the soap should be enameled or otherwise protected from corrosion. The mold may be of different sizes and shapes, for example, such that the resulting cake will be oval, round, square, rectangular, or any other shape by properly designing the individual molds, pistons and cover plates. Soaps of different character can be molded and cooled in the apparatus. The soap may thus be a "floating" soap of high purity, or it may be laundry or other soap containing other detergent ingredients compounded therein. The soap prior to molding and cooling, is subjected to the usual preliminary treatments well understood in the art. After such preliminary treatments, it will usually be brought to the soap container 16 at an elevated temperature, for example, around 150° to 175° F., and charged into the molds at approximately the same temperature. While the apparatus shown and described has six molds in each set, with six series extending circumferentially of the drum, it will be understood that a larger or smaller number may be provided in each set, and will operate in a similar manner. So also, the specific construction shown and described can be varied without departing from the spirit and scope of the invention.

I claim:—

1. An apparatus for molding and cooling soap, comprising a cylindrically arranged series of molds for individual cakes of soap, said molds opening outwardly means for filling the molds with molten soap, means for conveying the molds through a cooling liquid, and means traveling with the molds for closing them and protecting the soap therein from direct contact with the liquid while immersed therein.

2. An apparatus for molding and cooling soap, comprising a cylindrically arranged series of molds for individual cakes of soap, said molds opening outwardly, means for filling the molds with molten soap, means for conveying the molds through a cooling liquid, and cover sections or plates for closing the molds and protecting the soap from direct contact with the cooling liquid, said cover sections or plates being arranged as an endless belt to travel through the cooling liquid with the molds.

3. An apparatus for molding and cooling soap, comprising a plurality of series of molds for individual cakes of soap, said molds being cylindrically arranged and opening outwardly, means for filling a plurality of said molds simultaneously and different molds successively, means for rotating the molds within a receptacle containing cooling liquid, and a traveling belt having sections arranged to close the molds and protect the soap from direct contact with the cooling liquid while immersed therein, said traveling belt traveling through the liquid with the molds at substantially the same rate.

4. An apparatus for molding and cooling soap, comprising a receptacle for cooling liquid, a central shaft supporting a circumferential series of molds opening outwardly and arranged to rotate in said liquid, each of said molds having a piston therein, cam surfaces arranged to maintain the pistons in proper position during the rotation of the molds, a traveling belt having cover members adapted to cover the molds and protect the soap therein from direct contact with the brine while immersed therein, and guides for said traveling belt for holding the sections thereof into engagement or contact with the molds while passing through the cooling liquid.

5. An apparatus for cooling and molding soap, comprising a tank for a cooling liquid, a series of molds, each having an open side for permitting the same to be filled with soap, means for moving the molds in succession through the liquid in the tank, a series of cover plates for the open sides of the molds, said plates being mounted to move in contact with the molds through the liquid, and interlocking mechanism in connection with the molds and the cover plates for constraining said plates to assume a predetermined position with respect to the molds as they engage the molds and for constraining the said plates to travel with the molds and to hold such predetermined position throughout their travel with the molds.

6. An apparatus for cooling and molding soap, comprising a tank for a cooling liquid, a series of molds, each having an open side for permitting the same to be filled with soap, means for moving the molds in succession through the liquid in the tank, a series of cover plates for the open sides of the molds, said plates being mounted to move in contact with the molds through the liquid, and interlocking mechanism in connection with the molds and the cover plates for constraining said plates to assume a predetermined position with respect to the molds as they engage the molds and for constraining the said plates to travel with the molds and to hold such predetermined position throughout their travel with the molds, each of the molds having a movable bottom, and means controlled by the movement of the molds for gradually moving the bottoms toward the cover plates to compensate for the shrinkage and to compress the soap.

In testimony whereof I affix my signature.

CECIL O. PHILLIPS.